United States Patent [19]

Hughes

[11] Patent Number: 4,730,267
[45] Date of Patent: Mar. 8, 1988

[54] COMBINATION INTEGRATE AND DUMP FILTER AND LEVEL DETECTOR

[75] Inventor: William C. Hughes, Scotia, N.Y.

[73] Assignee: General Electric Company, Schenectady, N.Y.

[21] Appl. No.: 783,584

[22] Filed: Oct. 3, 1985

[51] Int. Cl.⁴ .............................................. H03D 3/02
[52] U.S. Cl. .................................. 364/839; 364/819; 375/97
[58] Field of Search ...................... 375/119, 95, 8, 42, 375/96, 102, 58, 57; 364/819, 839

[56] References Cited

U.S. PATENT DOCUMENTS

| 3,992,617 | 11/1976 | Epstein | 375/96 |
| 4,206,320 | 6/1980 | Reasler | 375/102 |
| 4,218,769 | 8/1980 | Cagle | 375/95 |
| 4,225,964 | 9/1980 | Cagle | 375/95 |
| 4,278,992 | 7/1981 | Christopher | 375/94 |
| 4,475,217 | 10/1984 | Hughes | 375/81 |

OTHER PUBLICATIONS

Patent Application General Electric RD-13341-entitled "Receiver for Phase Shift Modulated Carrier Signals", by W. C. Hughes, Ser. No. 697,994, filed Feb. 4, 1985, pp. 1-34 & 9 sheets of drawing.

Primary Examiner—Michael R. Fleming
Attorney, Agent, or Firm—Richard V. Burgujian; James C. Davis, Jr.; Paul R. Webb, II

[57] ABSTRACT

A combination integrate and dump filter comprises an amplifier for performing both the integrate and level detecting functions. Selective circuit configuration (SCC) apparatus is provided and responsive to a first state of a baud signal for providing reactive feedback to the amplifier such that voltage is stored by the SCC apparatus, which stored voltage represents the time integral of the input signal. The SCC apparatus is further responsive to a second state of the baud signal for terminating the reactive feedback and for coupling the stored voltage to the amplifier input such that the stored voltage is amplified and, therefore, the amplifier output represents the cumulative polarity of the input signal over the integration interval.

9 Claims, 2 Drawing Figures

COMBINATION INTEGRATE AND DUMP FILTER AND LEVEL DETECTOR

BACKGROUND OF THE INVENTION

The present invention is directed in general toward filtering devices and, more particularly, toward a combination integrate and dump filter and level detector.

Integrate and dump filters comprise filtering devices provided for integrating a voltage input over a specified time interval and, thereafter, providing the result of the integration as the filter output. These devices are generally employed for determining the cumulative polarity of the input signal over the integration time interval. As an example, integrate and dump filters have been employed to detect a data signal which has been phase shift modulated onto a carrier signal. U.S. Pat. No. 4,641,325 to Hughes. As another example, integrate and dump filters have been used to determine the synchronism of a baud signal with the input signal.

Prior art integrate and dump filters have proven bulky and expensive as excess circuitry has been provided to insure that the filter can integrate during the dump interval. Such insurance is generally necessary to provide a result which is accurate over the entire integration period. Hence, prior art integrate and dump filters have generally provided two capacitors and apparatus for switching each into the filter circuit such that one capacitor can be integrating while the other is dumping. Further, prior art integrate and dump filters have generally required additional elements for detecting and amplifying the integrated output such that an input signal having a slightly positive cumulative polarity over the baud period will provide a fully positive filter output and, conversely, an input signal having a slightly negative cumulative polarity over the baud period will provide a fully negative filter output.

It would be advantageous, therefore, to provide a combination integrate and dump filter and level detector which eliminates the need for excess capacitors and amplifiers and therefore greatly reduces production costs. Further, it would be advantageous to provide such an integrate and dump filter which also provides high immunity to coherent interference which is known to accompany phase shift modulated transmissions.

SUMMARY OF THE INVENTION

The present invention addresses these inadequacies of the prior art by providing a combination integrate and dump filter and level detector which uses one capacitor and one amplifier to accurately integrate an input signal and provide a fully positive or fully negative output to indicate the cumulative polarity of the integrated input signal.

An amplifier, having an input and an output, is provided for amplifying the input signal. Coupling means are provided for coupling the input signal to the amplifier input in response to a first state of a baud signal and for decoupling the input signal from the amplifier input in response to a second state of the baud signal. Selective circuit configuration (SCC) apparatus are included for providing reactive feedback between the amplifier output and the amplifier input and thereby store electrical energy which represents the time integral of the input signal, in response to a first state of the baud signal. Additionally, the SCC apparatus is responsive to a second state of the baud signal for discontinuing the reactive feedback and for coupling the stored electrical energy to the amplifier input such that the amplifier output will be indicative of the time integral of the input signal.

In an improved embodiment, a baud signal is provided having a period which is one-half of the integration period. A signal processing circuit is provided for receiving this baud signal and for providing therefrom a second baud signal having a period equal to the integration period. The first baud signal is coupled to the switching means such that the input signal is decoupled from the amplifier input for two intervals during the integration period. The second baud signal is coupled to the SCC apparatus such that the reactive feedback is discontinued for one interval during the integration period. In this manner, the switching means is used to interrupt the time integral for a short period wherein the value of a sinusoidal input voltage is equal and opposite to the value of the sinusoid during the dump period. Hence, the effects of coherent interference can be thus eliminated and, further, the results of the integral will more accurately reflect the phase relationship of the baud period and the input sinusoid period.

It is therefore, an object of the present invention to provide a combination integrate and dump filter and level detector which requires only one capacitor and one amplifier to provide both the amplifying and level detecting functions.

It is a further object of the present invention to provide a combination integrate and dump filter and level detector which provides an accurate representation of the cumulative polarity of an input signal without requiring a plurality of capacitors and/or amplifiers.

It is a still further object of the present invention to provide an improved method for integrating an input signal such that the integration and level detection functions can be provided by a single capacitor and amplifier.

BRIEF DESCRIPTION OF THE DRAWINGS

The subject matter which is regarded as invention is particularly pointed out and distinctly claimed in the numbered paragraphs appended hereto. However, the invention may best be understood, both as to organization and method of practice, by a reading of the following detailed description taken in conjunction with the drawings, in which:

DETAILED DESCRIPTION OF THE DRAWINGS

As mentioned hereinabove, the present invention is directed toward a combination integrate and dump filter and level detector which requires only one capacitor and one amplifier to provide both the integrate and level detecting functions. Such devices have been used for recovering a data signal which has been phase shift modulated onto a carrier signals disclosed in U.S. Pat. No. 4,641,325 to Hughes and assigned to the assignee of the present invention, which is incorporated herein, in its entirety, by the foregoing reference thereto. Further, such combination integrate and dump filters and level detectors have been used to determine the synchronism between a baud signal and an input signal.

Figure 1:
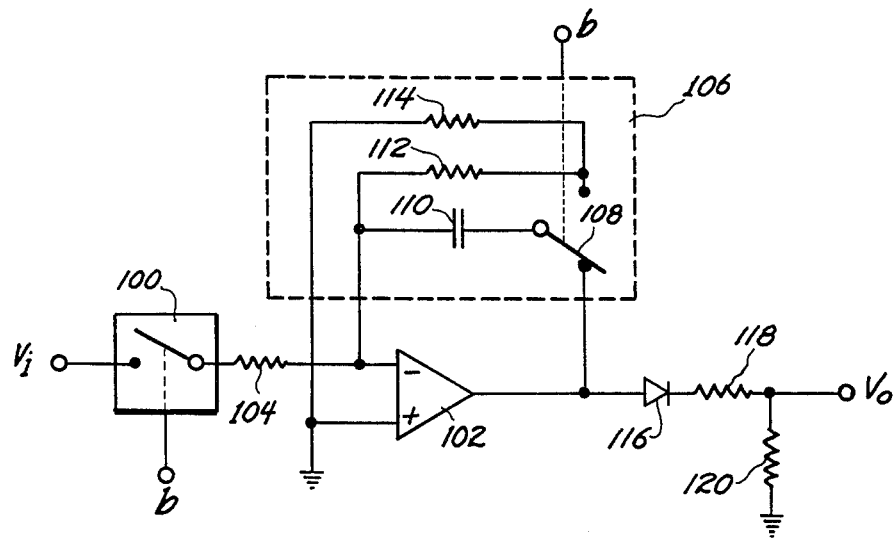
FIG. 1 is an illustrative block diagram of the combination integrate and dump filter and level detector which is the subject of the present invention.

As shown in FIG. 1, a switching device 100 is responsive to a baud signal b for coupling the input signal $V_i$ to the inverted input of an operational amplifier 102 via a resistor 104. In the preferred embodiment, switching device 100 is normally closed, i.e., in a position opposite that shown, such that the input voltage $V_i$ is coupled to operational amplifier 102 during inactive periods of the baud signal and, conversely, the input signal is decoupled from operational amplifier 102 during active periods of the baud signal. However, switching device 100 may comprise any means for coupling an input signal to operational amplifier 102 in response to a first state of the baud signal and for decoupling the input signal from amplifier 102 in response to a second state of the baud signal. As an example, switching device 100 may comprise a two position switch such as that available from the Motorola Company as a MC14053 switch.

Selective circuit configuration (SCC) apparatus 106 is provided for selectively: providing reactive feedback to operational amplifier 102 such that an integration is performed upon input signal $V_i$ and, discontinuing the reactive feedback such that the result of the integration can be amplified and provided as the filter output. SCC apparatus 106 is shown to comprise a two position switch 108 coupled to the output of operational amplifier 102 and responsive to the baud signal b for providing reactive feedback to operational amplifier 102 via a capacitor 110. In the preferred embodiment, switch 108 is normally in the position shown and responsive to an active baud signal for moving to a position opposite that shown in FIG. 1. Switch 108 may comprise any device, or combination of devices, for providing the two position switching function as described herein. As an example, switch 108 may comprise a three position switch such as that available from the Motorola Company as a MC14053 switch.

A resistor 112 is shown with one lead coupled to switch 108 and the other lead coupled to capacitor 110 and operational amplifier 102. A resistor 114 is provided with one lead coupled to resistor 112 and the other lead coupled to ground. In this configuration, resistors 112 and 114 are coupled in series to provide a high impedance between the inverted and noninverted inputs of operational amplifier 102 while the filter is integrating, i.e., switch 108 is in the position as shown in FIG. 1. When switch 108 is moved to a position opposite that shown in FIG. 1, capacitor 110 is coupled in parallel with resistor 112, the combination of which is coupled in series with resistor 114 between the inverted and noninverted inputs of operational amplifier 102. In this configuration, the electrical voltage stored as charge within capacitor 110 is coupled to the input of high gain amplifier 102 such that this energy is amplified and provided as the amplifier output. Hence, while switch 108 is in a position as shown in FIG. 1, the apparatus of FIG. 1 is integrating the input voltage $V_i$ and storing the result of this integration as electrical voltage across capacitor 110. When switch 108 is moved to a position opposite that shown in FIG. 1, the aparatus of FIG. 1 becomes a level detector such that the electrical voltage previously stored across capacitor 110 is amplified by amplifier 102. The amplifier will, therefore, provide a fully positive or fully negative output indicative of the cumulative polarity of the input signal $V_i$ over the integration interval.

Resistor 104 together with capacitor 110 and high gain amplifier 102 comprises the integrator. When switch 108 is in the position shown, the voltage across capacitor 110 will equal the time integral of the input voltage $V_i$ divided by the product of the capacitance and resistance of capacitor 110 and resistor 104, respectfully. Hence, resistor 104 may be selected to enhance the sensitivity of the filter. In the preferred embodiment, resistor 104 is chosen as a 62 kilohm resistor.

Additionally, capacitor 110 and resistor 112 may be chosen to limit the dump time of the filter. In the preferred embodiment, resistor 112 comprises a one kilohm resistor and capacitor 110 comprises a 0.2 mf capacitor to provide a dump time of less than 1 millisecond. Resistor 114 is chosen to provide a high impedance between the inverted and noninverted inputs to operational amplifier 102 while the amplifier is acting as an integrator. In the preferred embodiment, resistor 114 is chosen as a 62 kilohm resistor.

Operational amplifier 102 may comprise any means for amplifying the input voltage signal $V_i$. In the preferred embodiment, amplifier 102 comprises an HA4741 operational amplifier as available from the Harris Company. Although amplifying means 102 is shown and described as an operational amplifier herein, it will be apparent to those of skill in the art that amplifying means 102 may comprise any means for amplifying input signal $V_i$, which amplifying means would preferably have a high gain.

A diode 116 and a voltage divider comprising two resistors 118 and 120 are provided for clipping the output of the filter such that the filter output is compatible with standard semiconductor integrated circuitry. Resistors 118 and 120 are selected to provide an output voltage of approximately 5 volts for fully positive amplifier output. Diode 116 is provided for clipping a fully negative amplifier output such that the filter output will be approximately 0 volts. Hence, the filter shown in FIG. 1 may be readily included in an integrated semiconductor circuit such as that shown and described in the aforereferenced U.S. Pat. No. (U.S. Pat. Application Ser. No. 697,994 filed Feb. 4, 1985), to Hughes.

Figure 2:
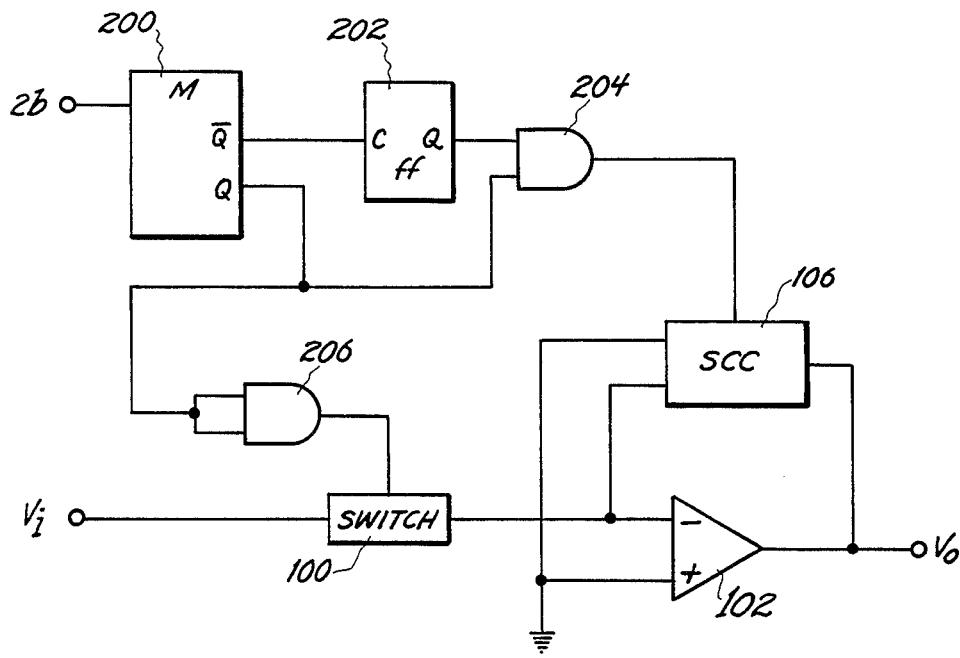
FIG. 2 is an illustrative block diagram of an improved combination integrate and dump filter and level detector which is adapted to minimize the effects of coherent interference.

In another embodiment, apparatus is provided for improving the accuracy of the subject filter and for eliminating coherent interference which may accompany phase shift modulated transmissions. As shown in FIG. 2, wherein like elements have like reference numerals, a monostable multivibrator 200 is provided for receiving a baud signal 2b having a period which is one-half of the desired integration period. The inverted output of monostable multivibrator 200 is shown coupled to a flip-flop 202 which is adapted for counting the pulses received from multivibrator 200 as is known in the art. Flip-flop 202 is shown coupled to one input of an AND gate 204 with the other input of AND gate 204 coupled to receive the noninverted output from monostable 200. Monostable 200, flip-flop 202 and AND gate 204 are provided for dividing the baud signal input such that SCC apparatus 106 will dump for every other occurrence of an active input baud signal.

The noninverted output of monostable 200 is also shown coupled to switch 100 via an AND gate 206 which is included for providing a delay between the monostable output and switch 100 so that active control signals are provided to switch 100 and SCC apparatus 106 simultaneously. The output of monostable 200 is chosen to have an active period which is equal to the desired dump time interval. Note that the output of flip-flop 202 changes state on the positive edge of the waveform on its clock input, i.e., the inverted output of monostable 200, so that the output of flip-flop 202 will change state at a time when the noninverted output of monostable 200 is low and, therefore, the outputs of both AND gates 204 and 206 are not active.

In this configuration, the first input baud signal will pass through AND gate 206 and control switch 100 to decouple the input signal $V_i$ from operational amplifier 102. During this interval, the noninverted output from flip-flop 202 will be nonactive such that the output of AND gate 204 is nonactive and the configuration of SCC apparatus 106 remains unchanged. As noninverted output of monostable 200 transitions from high to low, both AND gates 204 and 206 will be inactivated. Shortly thereafter, the noninverted output of flip-flop 202 will become active and the output of AND gate 204 will be determined by the noninverted output of monostable 200. When the input baud signal again becomes active, the outputs of both AND gates 204 and 206 will become active simultaneously such that input signal $V_i$ is disconnected from the noninverted input via switch 100 and further such that SCC apparatus 106 is reconfigured to allow the filter to act as a level detector as described hereinabove.

By decoupling the input signal $V_i$ from the amplifier input at a point midway between the integration period, the present embodiment acts to eliminate the effect on the filter output which is due to coherent interference. As such, the embodiment of FIG. 2 represents an improvement upon the embodiment of FIG. 1.

A novel method for integrating an input signal to provide a level detected output indicative of the cumulative polarity of the input signal comprises the steps of first coupling the input signal to an amplifier and simultaneously providing reactive feedback to the input of the amplifier such that electrical voltage is stored which energy represents the integral of the input signal and, thereafter, decoupling the input from the amplifier and simultaneously decoupling the reactive feedback such that the stored electrical voltage is provided as input to the amplifier and the amplifier output represents the cumulative polarity of the input signal.

Thus, apparatus and method have been described for providing a combination integrate and dump filter and level detector which uses only one amplifier and one capacitor to provide both integrate and dump and level detecting functions. It will be appreciated by those skilled in the art that while only certain embodiments have been described in detail herein, many modifications and changes may be readily made without departing from the true spirit and scope of the invention. The appended claims, therefore, are intended to cover all such modifications and changes.

What is claimed is:

1. Apparatus for integrating an input signal in response to a baud signal, comprising:

means for amplifying said input signal, said amplifying means having an input and an output;

coupling means, coupled to receive said baud signal and said input signal, for coupling said input signal to said amplifying means input in response to a first state of said baud signal, said coupling means being responsive to a second state of said baud signal for decoupling said input signal from said amplifying means input; and selective circuit configuration (SCC) means, coupled between said amplifying means input and output and further coupled to receive said baud signal, responsive to said first state of said baud signal for providing reactive feedback between said amplifying means input and said amplifying means output such that electrical voltage representing a time integral of said input signal is stored by said SCC means, said SCC means being responsive to said second state of said baud signal for discontinuing said reactive feedback and for coupling said stored voltage to said amplifying means input such that said stored voltage is amplfied by said amplifying means and, therefore, said amplifying means output is indicative of the time integral of said input signal.

2. Apparatus as recited in claim 1 wherein said selective circuit configuration (SCC) means comprises:

a capacitor having first and second conductors, said first conductor of said capacitor being coupled to said amplifying means input;

a first resistor having first and second conductors, said first conductor of said first resistor being coupled to said amplifying means input;

a second resistor having first and second conductors, said first conductor of said second resistor being coupled to a reference potential; and first state of said switch means responsive to said first state of said baud signal for coupling said amplifying means output to said second conductor of said capacitor, said switch means being responsive to said second state of said baud signal for coupling said second conductor of said capacitor to said second conductors of said first and second resistors.

3. Apparatus as recited in claim 2 wherein said amplifying means comprises an operational amplifier and wherein a non-inverted input of said operational amplifier is coupled to said reference potential and an inverted input of said operational amplifier comprises said amplifying means input.

4. Apparatus for integrating an input signal in response to a baud signal, comprising:

control means, coupled to receive said baud signal, for dividing a period of said baud signal to provide first and second control signals wherein a period of said first control signal is twice a period of said second control signal;

means for amplifying said input signal, said amplifying means having an input and an output;

coupling means, coupled to said control means to receive said second control signal, responsive to a first state of said second control signal for coupling said input signal to said amplifying means input, said coupling means being responsive to a second state of said second control signal for decoupling said input signal from said amplifying means input; and selective circuit configuration (SCC) means, coupled between said amplifying means input and output and further coupled to receive said first control signal, responsive to a first state of said first control signal for providing reactive feedback between said amplifying means input and said amplifying means output such that electrical voltage representing the time integral of said input signal is stored by said SCC means, said SCC means being responsive to a second state of said first control signal for discontinuing said reactive feedback and for coupling said stored electrical voltage to said amplifying means input such that said stored voltage is amplified by said amplifying means and, therefore, said amplifying means output is indicative of the time integral of said input signal, and further such that the effect on said amplifying means output caused by coherent interference is minimized.

5. Apparatus as recited in claim 4 wherein said selective circuit configuration (SCC) means comprises:
a capacitor having first and second conductors, said first conductor of said capacitor being coupled to said amplifying means input;
a first resistor having first and second conductors, said first conductor of said first resistor being coupled to said amplifying means input;
a second resistor having first and second conductors, said first conductor of said second resistor being coupled to a reference potential; and
switch means responsive to a first state of said first control signal for coupling said amplifying means output to said second conductor of said capacitor, said switch means being responsive to a second state of said first control signal for coupling said second conductor of said capacitor to said second conductors of said first and second resistors.

6. Apparatus as recited in claim 5 wherein said control means comprises:
monostable means for modulating the active period of said first and second control signals, said monostable means being responsive to said baud signal to provide first and second outputs, both of specified duration, wherein said first output comprises the inverse of said second output;
flip-flop means responsive to said second output of said monostable means for dividing the period of said second output of said monostable means;
a first AND gate having first and second inputs, said first input being coupled to said flip-flop means output and said second input being coupled to said first output of said monostable means, said first AND gate output comprising said first control signal; and
a second AND gate having first and second inputs both coupled to said first output of said monostable means, said second AND gate output comprising said second control signal.

7. Apparatus as recited in claim 6 wherein said amplifying means comprises an operational amplifier and wherein a noninverted input of said operational amplifier is coupled to said reference potential and an inverted input of said operational amplifier comprises said amplifying means input.

8. A method for integrating an input signal comprising the steps of:
coupling said input signal to an input of an amplifier and simultaneously providing reactive feedback from an output of said amplifier to said amplifier input via a feedback circuit
storing in said feedback circuit an electrical voltage representing a time integral of said input voltage;
decoupling said input signal from the input of said amplifier and simultaneously coupling said feedback circuit to said amplifer input to thereby couple the stored electrical voltage representing the time integral of said input voltage to said amplfier input; and
providing an amplified output from said amplifier indicative of a polarity of the time integral of said input signal.

9. The method as recited in claim 8 further comprising the step of decoupling said input signal from said amplifier at a point in time intermediate the time integral such that the portion of the time integral which is lost during the dumping and level detecting functions is compensated for and therefore the effects on the integrator output due to coherent interference is minimized.

* * * * *